US006807900B2

(12) United States Patent
Iori (10) Patent No.: US 6,807,900 B2
(45) Date of Patent: Oct. 26, 2004

(54) AUTOMATIC MACHINE FOR COOKING FOOD IN A LIQUID

(75) Inventor: Angelo Iori, Reggio Emilia (IT)

(73) Assignee: Techfood S.N.C. Di Iori E Castagnetti, Castelnovo Sotto (IT)

( * ) Notice: Subject to any disclaimer, the term of this patent is extended or adjusted under 35 U.S.C. 154(b) by 0 days.

(21) Appl. No.: 10/634,805

(22) Filed: Aug. 6, 2003

(65) Prior Publication Data

US 2004/0025707 A1 Feb. 12, 2004

(30) Foreign Application Priority Data

Aug. 6, 2002 (IT) ...................................... MI2002A1794

(51) Int. Cl.$^7$ ............................. A47J 37/12; A23L 1/00
(52) U.S. Cl. ............................. 99/404; 99/330; 99/407; 99/409; 99/416
(58) Field of Search ........................... 99/330–336, 427, 99/448, 403–418, 443 R, 443 C, 352–355; 426/438, 520, 523; 126/302, 391.1, 21 A, 390.1; 210/167, 400, DIG. 8

(56) References Cited

U.S. PATENT DOCUMENTS

| 2,967,474 A | * | 1/1961 | Ford ........................... 99/404 |
| 3,474,726 A | | 10/1969 | Curtin |
| 3,761,290 A | * | 9/1973 | Brunner ........................ 99/330 |
| 4,228,730 A | * | 10/1980 | Schindler et al. ......... 99/329 R |
| 4,379,055 A | * | 4/1983 | Carlson et al. ............. 210/400 |
| 4,478,140 A | * | 10/1984 | Bullock ........................ 99/404 |
| 4,685,386 A | * | 8/1987 | Bezon .......................... 99/404 |
| 4,694,742 A | * | 9/1987 | Dover .......................... 99/404 |
| 5,052,287 A | * | 10/1991 | Chiang ......................... 99/404 |
| 5,165,330 A | * | 11/1992 | Giacomini .................... 99/404 |
| 6,062,132 A | * | 5/2000 | Morris ......................... 99/404 |

FOREIGN PATENT DOCUMENTS

| DE | 196 50 235 | 6/1998 |
| EP | 0 511 945 | 11/1992 |
| FR | 2 642 955 | 8/1990 |
| FR | 2 653 000 | 4/1991 |
| GB | 988592 | 4/1965 |

* cited by examiner

Primary Examiner—Timothy F. Simone
(74) Attorney, Agent, or Firm—Young & Thompson (57) ABSTRACT

The machine enables food to be automatically cooked in a liquid or to complete its cooking. It comprises a vessel for the cooking liquid, elements for heating the cooking liquid, and elements for maintaining the liquid level in the cooking vessel substantially constant. The machine also comprises a series of liquid-permeable seats, each arranged to receive food to be cooked or whose cooking has to be completed, means for moving the seats along a predetermined cyclic path, during a part of which the food contained in the seats is immersed in the cooking for a time sufficient to cook the food or to complete its cooking, a station in which the food to be cooked or the food for completion of cooking can be fed into each seat, and a station in which the cooked food can be extracted from the relative seat.

27 Claims, 5 Drawing Sheets

AUTOMATIC MACHINE FOR COOKING FOOD IN A LIQUID

The present invention relates to a machine for cooking food in a liquid, and in particular for cooking Italian-style pasta in water or potatoes in water or oil.

Machines for cooking Italian-style pasta are already known and have been used for many years. One of the most recent and highly successful models is that described in MI2001A000189, produced by the proprietor of the present patent application. This machine, of roughly parallelepiped shape, presents an aperture for access to an internal compartment, the aperture involving the front and upper face of the machine and being closed by two relative doors. In the internal compartment there is provided a cooking vessel into which the cooking water is fed and maintained at a predetermined level by a top-up device fed by a relative reservoir. The machine also comprises means for heating the water in the cooking vessel and one or more baskets which when located in one of their positions are at least partly immersed in the water in the vessel and are arranged to receive the quantity of pasta to be cooked. The baskets can be rotated to cause the pasta, when cooked, to fall into a collection container located in an outwardly openable drawer or forming part of this drawer. A control unit controls the machine operation.

The present invention provides a machine for automatically cooking pasta which is decidedly more simple and less costly than known pasta cooking machines.

More generally, the present invention aims to provided a machine for automatically cooking food in a liquid, and in particular for cooking Italian-style pasta in water or for frying or boiling potatoes. This object is attained by the machine of the present invention, comprising a vessel for the cooking liquid, means for heating the cooking liquid, and means for maintaining the liquid level in the cooking vessel substantially constant, characterised by comprising a series of liquid-permeable seats, each arranged to receive food to be cooked or food whose cooking has to be completed, means for moving these seats along a predetermined cyclic path, during a part of which the food contained in the seats is immersed in the cooking liquid for a time sufficient to cook the food or to complete its cooking, a station in which the food to be cooked or the food whose cooking has to be completed can be fed into each seat, and a station in which the cooked food can be extracted from the relative seat.

It should be noted that the term "station" does not mean that said seats are required to halt at said stations, but merely indicates the existence of a position in which the food can be inserted into each seat or extracted from each seat, the seats not necessarily interrupting their movement during these operations.

Conveniently the means for moving the seats along the relative predetermined cyclic path consist of a wheel element lying in a vertical plane and located above the cooking vessel, the seats for the food being provided on the periphery of the wheel element.

The invention will be more apparent from the following description of one embodiment thereof. In this description reference is made to the accompanying drawings, in which.

It has to be pointed out that, although the machine shown in FIGS. 1–9 will be disclosed for cooking Italian-style pasta, the same machine can be used for boiling or frying potatoes, (provided that the heating means have an adequate power for frying potatoes or other food) or other food which can be cooked in a liquid.

As can be seen from FIGS. 1–9, the pasta cooking machine 10 includes a casing indicated overall by 12 and comprising a rear part 14, an upper part 16, an upper front part 18 and a lower front part 20. This latter forms part of a base 22 (FIG. 5) which is provided with four feet 24 and in its rear part contains a vessel 26 into which the cooking water is fed. The vessel 26 is provided with conventional (hence not shown for simplicity) means for heating the water contained therein.

The upper part 16 of the casing 12 is arch-shaped and is fixed to an underlying tubular structure 28 (best seen in FIG. 5) comprising two vertical parallel arch elements 29, the structure 28 being carried by the base 22. The structure 28 encloses an element 30 shaped as a cylindrical surface of circular directrix and constructed of perforated stainless steel sheet. A stainless steel wheel element 32, formed from two lateral circular ring-shaped perforated metal sheets 34 connected together by radial perforated baffles 48, is inserted coaxially in a sufficiently precise manner (in order, as will be apparent hereinafter, not to enable the pasta to escape) into the cylindrical element 30 disposed with its axis horizontal. The wheel element 32 hence presents an inner cylindrical free space. The element 32 is supported by six idle rollers, three for each side of the wheel element 32 and disposed angularly equidistant (120 degrees apart), so that the wheel element can rotate about its horizontal axis.

Figure 1:
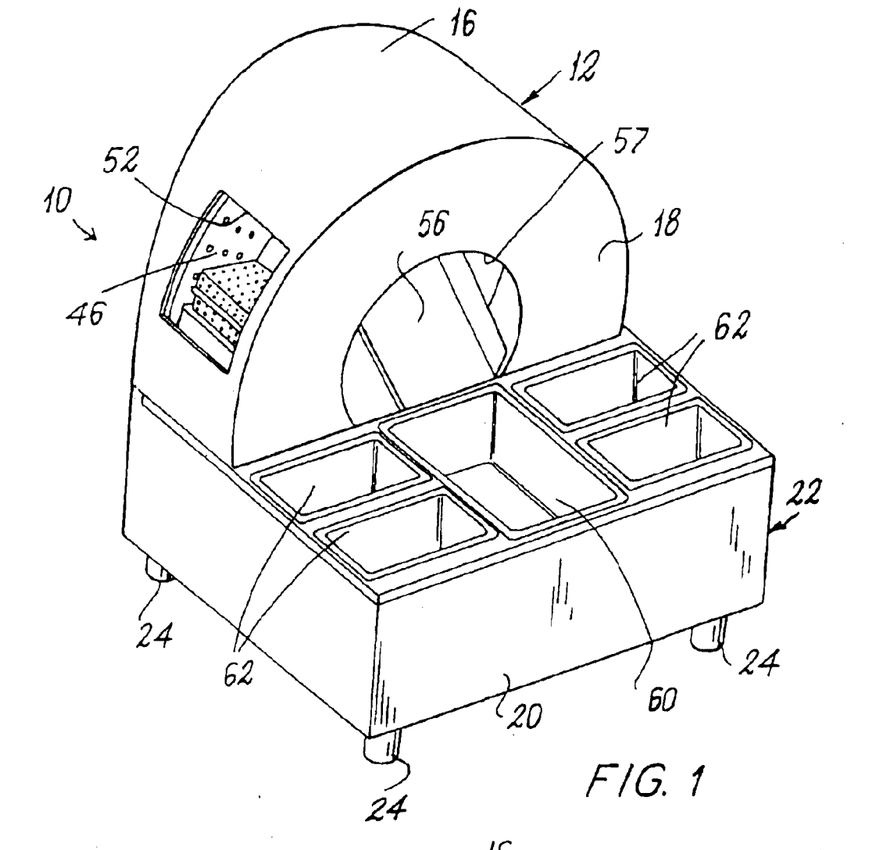
FIG. 1 is a perspective view of a first embodiment of a pasta cooking machine according to the invention.
Figure 2:
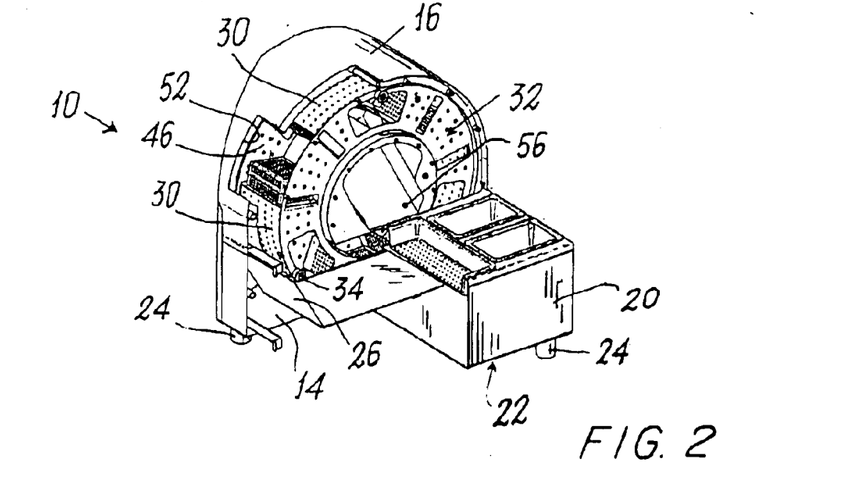
FIG. 2 differs from FIG. 2 not only by the different scale, but also in that the machine is partly cut away to show some of its internal parts.
Figures 6, 7, 8, 9:
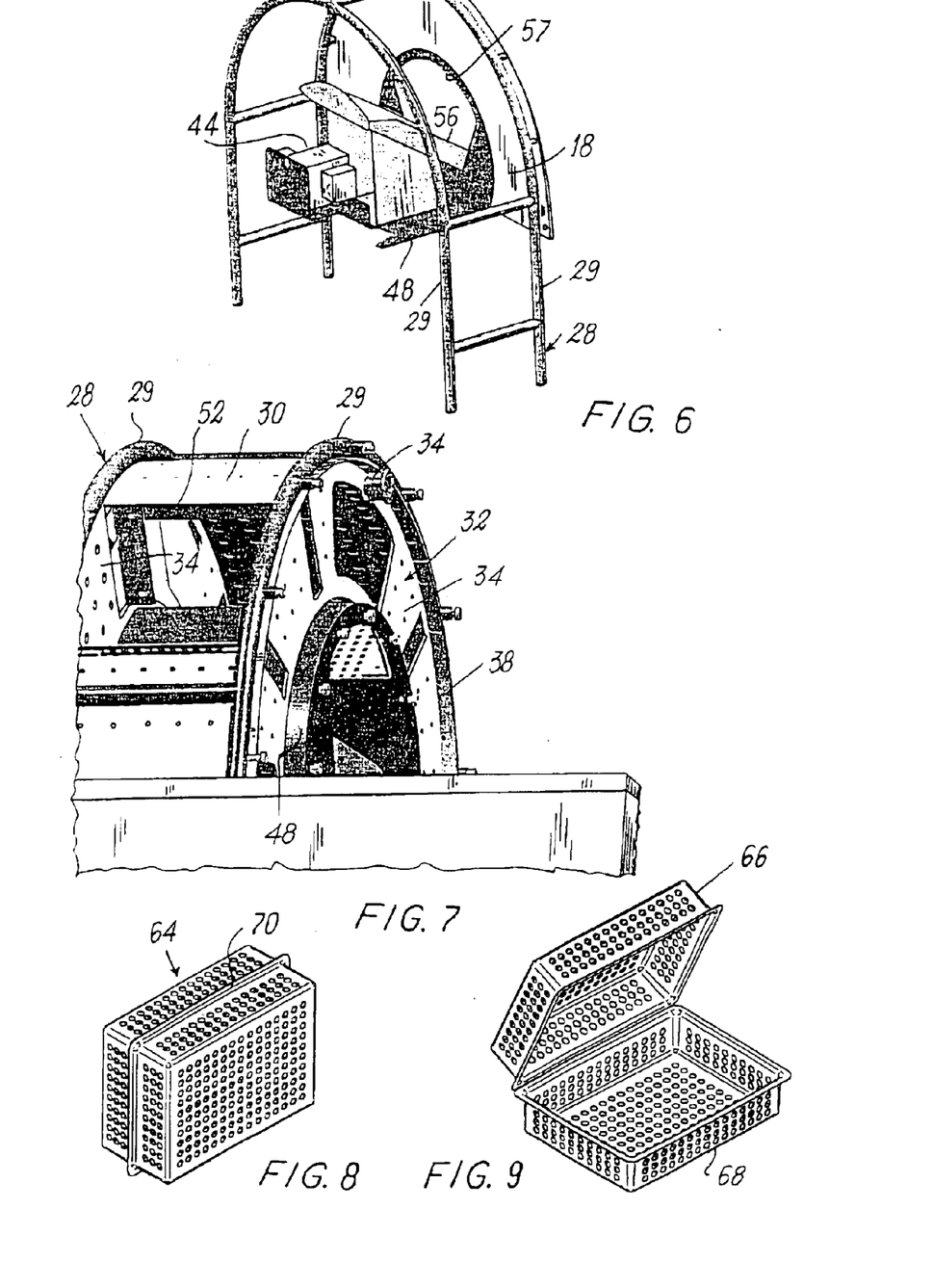
FIG. 6 is a partial perspective view showing some details of the machine.
FIG. 7 is a partial perspective view showing other details of the machine.
FIG. 8 shows a container for packaging the pasta to be fed into the machine.
FIG. 9 shows the same container open.
Figure 10:
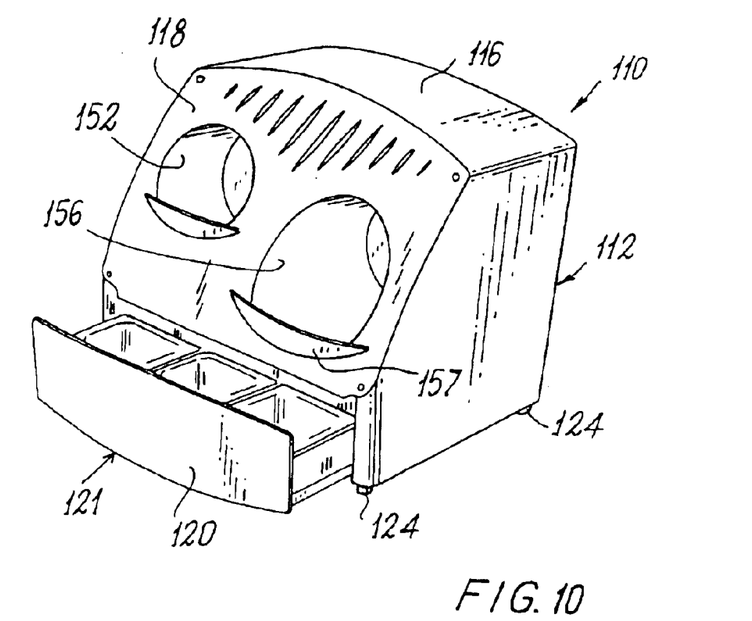
FIG. 10 is a perspective view of a second embodiment of the pasta cooking machine according to the invention.

One of these rollers, indicated by 36, is visible in FIG. 2, another being visible in FIG. 7. From this latter figure it can be seen that the relative roller 36 (as do all the other rollers 36) presents a raised far edge. On the inside of each of the two arched elements 29 of the tubular structure 28 there is fixed a vertical circular guide 38 obtained by rolling a flat profile bar, the three rollers 36 present on the relative side 34 of the wheel element 32 being able to slide on the inner face of each of the two guides 38. The wheel element 32 is hence supported and (by virtue of the outer raised edge of the rollers 36) maintained in position, while being able to rotate about its axis.

To the rear face of the wheel element 32 there is fixed an element 40 of roughly triangular shape, the central part of which presents a coaxial cylindrical projection 42, coaxially with which there is provided a bush 45 internally toothed to engage a corresponding pinion keyed into the drive shaft of an electric motor 44 inserted into the space inside the cylindrical projection 42. The motor 44 is juttingly supported by a support element 48 of profiled sheet metal, which is fixed to the upper front part 18 of the casing 12. The motor 44 rotates the wheel element 32 about its axis.

Figure 5:
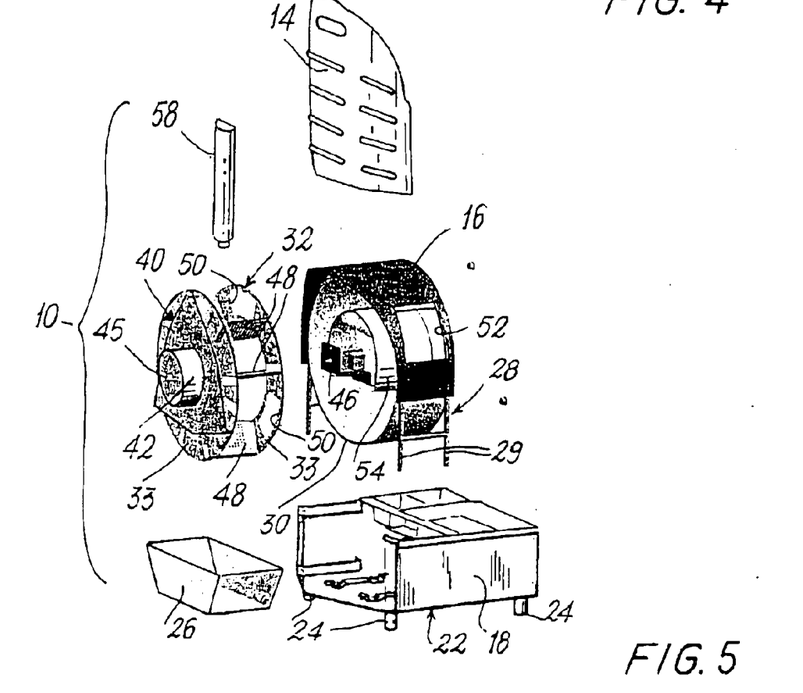
FIG. 5 is a partly exploded perspective view thereof, seen from the rear side.

The wheel element 32 presents a series (three in this specific example) of angularly equidistant equal seats 46 which open peripherally outwards. The seats 46 (FIG. 2) are defined by radial baffles 48 (FIG. 5). The walls of the seats 46 are perforated in order to be permeable to water. The front wall of each seat 46 presents an aperture 50, the purpose of which will be apparent hereinafter.

Access to the seats 46 (to feed therein the pasta to be cooked or of which the cooking has to be completed) is gained via a loading station consisting essentially of a loading aperture 52 provided in the top 16 of the casing 12, corresponding with the aperture 52 there being a similar aperture in the fixed cylindrical element 30. When the wheel element 32 is rotated (anticlockwise with reference to FIG. 1) by the motor 44, the seats 46 are closed at their bottom when situated in the upper half of the fixed cylindrical element 30, otherwise the absence of a bottom would mean that the pasta fed therein would fall out of the seat 46. This is obtained by providing a semi-cylindrical baffle 54 fixed indirectly to the structure 28 (FIG. 5), which however presents at its top an aperture (not visible) which corresponds to the discharge station, below which there is provided a chute 56 (FIG. 6) also carried by the support 48, the purpose of which will be apparent hereinafter.

Figure 3:
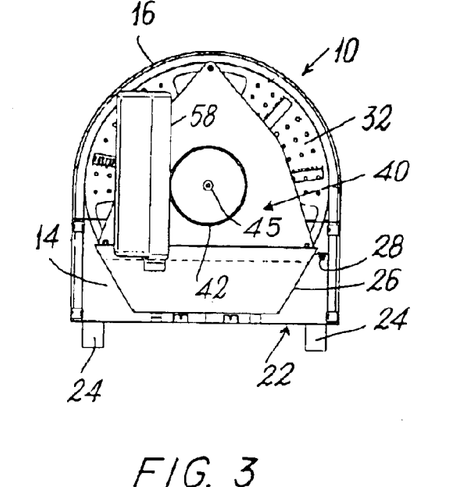
FIG. 3 is a rear elevation thereof, the machine being shown without the rear cover.
Figure 4:
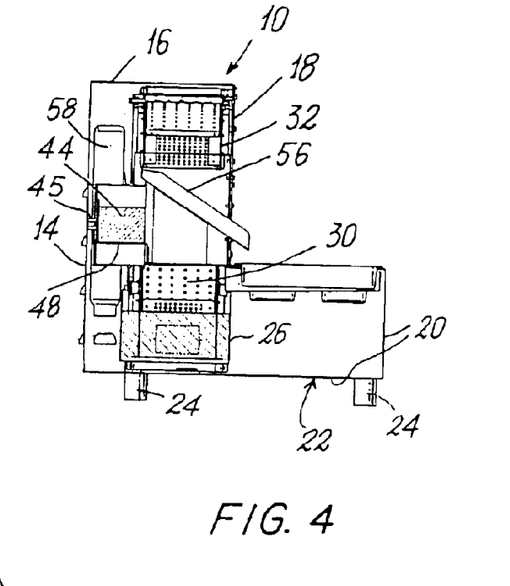
FIG. 4 is a vertical section therethrough passing through the axis of the machine wheel element.

The water in the cooking vessel 26 (level of which decreases following prolonged boiling of the water) is maintained substantially at the same level by a device 58 (FIG. 5), which is no more than a sort of bottle which is filled with water and then inverted above the vessel 26, so that its mouth dips into the water in the vessel (as shown in FIG. 3). By virtue of the device 58, which is extremely simple and truly inexpensive, the valves and level sensors used in known pasta cooking machines are not required, such devices being costly and at the same time of poor reliability.

The base 22 of the machine 10 is shaped to receive in its front part a tray 60 for collecting the cooked pasta which (as will be seen) automatically leaves the chute 56, and four trays in which to place the sauces for flavouring the cooked pasta.

The upper front part 18 of the machine casing 12 can also be formed of a transparent material to more easily verify, from the rotation of the wheel element 32, that the machine is operating.

As already stated, the machine comprises three cooking seats 46. It is however apparent that by suitably dimensioning the wheel element 32 any number of seats can be provided.

The operation of the pasta cooking machine 10 will now be described, even though apparent from the aforegoing description.

When the predetermined quantity of water has been fed into the vessel 26 and the device 58 has been filled and put in position, the cooking water heating means (not shown for simplicity and also because of totally conventional type) are activated. The motor 44 is then started, so that the wheel element 32 (with reference to FIG. 1, even though the wheel element is not directly visible therein) begins to rotate in the anticlockwise direction. The required quantity of pasta is then fed through the loading aperture 52 into that seat 46 which at that moment is passing by the aperture. This operation can then be repeated for the other seats 46 which gradually pass by the loading aperture 52. The quantity of pasta fed into each seat 46 must evidently not exceed a maximum predetermined amount depending on the capacity of the seats 46. In the specific example of the machine 10, the maximum quantity corresponds to four portions of pasta, although obviously a quantity corresponding to one, two or three portions, or any intermediate quantity, can be fed in. On continuing to rotate the wheel element 32 at constant angular speed in the anticlockwise direction, the pasta contained in said seat 46 becomes at a certain moment immersed in the water in the cooking vessel 26 which in the meantime has boiled. The speed of rotation of the wheel element 32 is chosen such that the pasta remains in the water in the vessel 26 for a time sufficient to cook it, after which (the rotation proceeding) the pasta has all the time required to drain before the relative seat 46 reaches the highest angular position (discharge station) which it is able to assume and in which, by virtue of the chute 56, the cooked pasta is discharged through the aperture 57 present in the upper front part 18 of the casing 12, hence falling into the collection tray 60. At this point the operator can form the portions by distributing the pasta among the various plates or containers, and then flavour each portion with the sauces contained in the trays 62. It should be noted that because of their position close to the cooking vessel 26, the sauces in the trays 62 and the cooked pasta in the discharge tray 60 are maintained hot. Indipendent heating means (such as electric resistors) can be provided to this end)

As in all known pasta cooking machines, the cooking water must be periodically changed.

The machine 10 is provided with a control unit (not shown but of conventional type), preferably of microprocessor type, which supervises its operation and in particular enables the speed of rotation of the wheel element 32 to be programmed on the basis of the required pasta cooking times, maintenance of correct cooking water temperature, and other verification and diagnostic functions (for example monitoring the number of portions dispensed).

Although the aforedescribed machine 10 is of much lower construction cost than known pasta cooking machines and is of very simple and low-cost maintenance, the machine of the invention could be formed in a manner different from the machine 10. For example the seats for the pasta could consist of baskets suspended angularly equidistant from the periphery of a wheel element, to remain immersed in the cooking water for a part of their path (which in this case would also be circular) and for a suitable time. The cooked pasta could be expelled from the relative basket either by manual intervention of the operator or by providing a means which (for example by interference with a fixed element disposed in a suitable position) automatically overturns the basket so that the pasta contained in it falls into an underlying collection tray.

Again, in the machine of the invention the path taken by the seats, for example in the form of baskets suspended from a chain, could be other than circular (for example oval), with the baskets (and hence the pasta contained in them) likewise remaining immersed in the cooking water for a part of the path.

Conveniently the quantity of pasta to be fed into each seat 46 (hereinafter reference will still be made to the machine 10 for clarity) can be prepacked in a suitable water-permeable container, to facilitate both the loading of the pasta into the machine 10, and the removal of the cooked pasta therefrom. A suitable container can for example be that shown, respectively closed and open, in FIGS. 8 and 9 and indicated by 64. The container 64 is perforated and formed of a material (preferably plastic) suitable for contact with foods and able to resist boiling water without deforming. In this specific example it comprises two specularly disposed equal portions 66 and 68 conventionally hinged together such as to enable the container 64 to be opened as shown in FIG. 9. Each of the two parts 66 and 68 presents an edge rib which, with the container 64 closed, forms a flat middle double rib 70. On each of the front and rear inner walls of the seats 46 of the wheel element 32 there is provided in this specific example a corresponding radial groove (not shown for simplicity) into which the respective part of the double rib 70 of the container 64 is inserted such that it remains in position by virtue of the presence of the semi-cylindrical element 54 and the cylindrical element 30. After the cooking and the subsequent stage in which the pasta is drained, the container 64 lies in the discharge station, and emerges by gravity via the chute 56 to fall into the collection tray 60, where it can be opened.

Conveniently the pasta (or, more generally, the food) fed into the container can be previously partly cooked and packaged in the container 64, which is then deep frozen. The container 64 is then preserved in a freezer. It has been found that in this manner with the machine of the present invention, the pasta quantity relative to one seat can be cooked in a time between a maximum of 4 minutes and a minimum of 20 seconds, depending on the type of pasta and the degree of precooking, and the power of the heating means for the cooking water.

It should be noted that containers for once-only use (which are then disposed of after use) and/or preferably single-portion containers can be used. Moreover the machine can be provided with conventional recognition means which (by means of the machine control unit) enable only a specific type of container to be used, and prohibit the use of the same container more than once, and which also count the number of containers fed into the machine.

It has to be pointed out that the container for the food may also be a liquid permeable bag insertable in the seats.

Preferably the material forming the container is able to withstand temperatures between −25° C. and 230° C.

The embodiment shown in FIGS. 10–13, designated by reference numeral 110, is easier to be manufactured than that (10) in FIGS. 1–9.

Also in this case, machine 110 will be disclosed for cooking Italian-style pasta, bearing in wind, however, that such a machine can be used for boiling or frying potatoes or other food.

The pasta cooking machine 110 includes a casing 112 having a slanted upper front part 118, a lower front part 120, and an upper curved part 116, this latter being the front part of a drawer 121 slidingly supported by a base 122 (FIG. 11) provided with four feet 124. The base 122 supports a cooking vessel 126 (FIGS. 11 and 12) which is fed with the cooking water. Also in this case the vessel 126 is provided with conventional means (not shown for simplicity) for heating the water therein. Similarly to the previous embodiment 10, there is provided a conventional device (not shown for simplicity) for maintaining the water in the cooking vessel 126 substantially at the same level.

A rotatable element 132, positioned over the cooking vessel 126, has two diametrally opposed arms 148 extending from a shaft 142 rotatably supported by a bush 143 fixed to a structure 140 by means of screws, the structure 140 being supported by the base 122. The seats 146 are opened towards the front side of the machine 110.

An electric motor 144, also supported by the structure 140, allows the shaft 142 to rotate.

Figure 11:
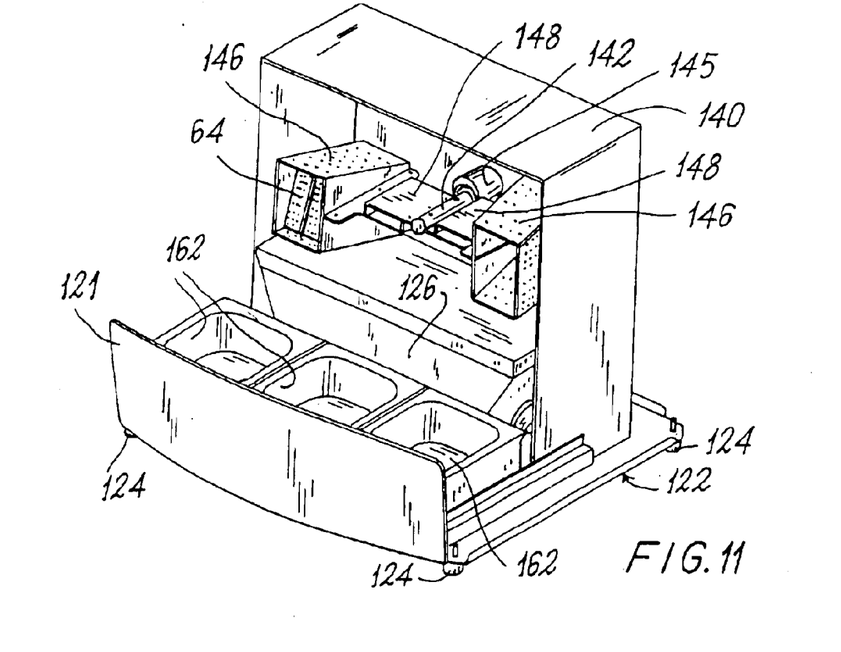
FIG. 11 is a perspective view of the same machine of FIG. 1, the machine being deprived of the casing.
Figure 12:
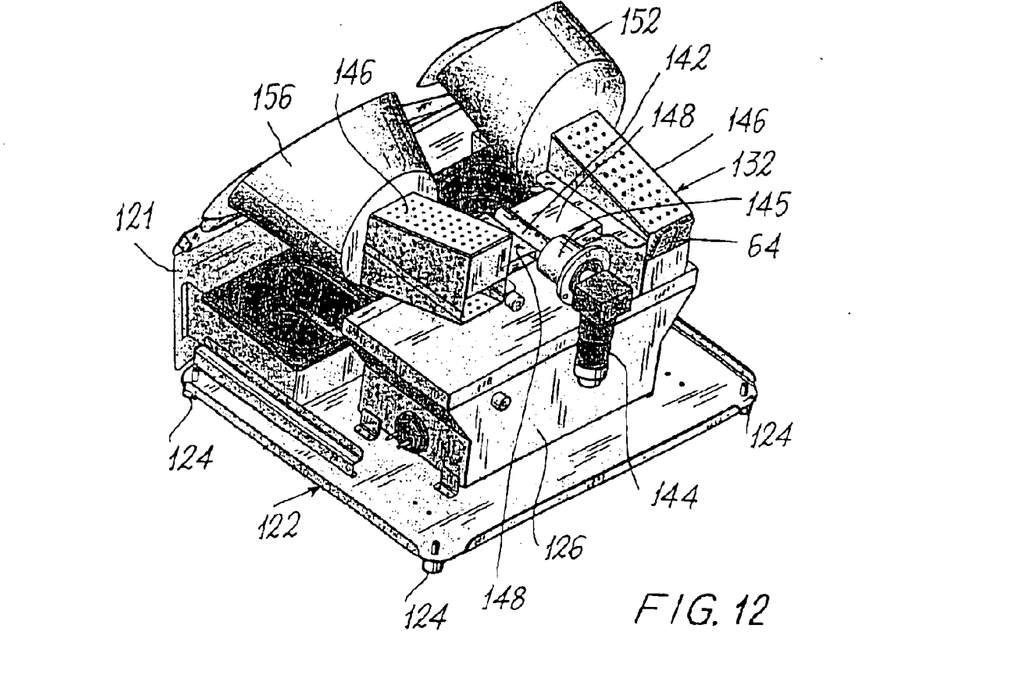
FIG. 12 is similar to FIG. 11, with the difference that the machine is seen from a different point of view and some internal components have been removed.
Figure 13:
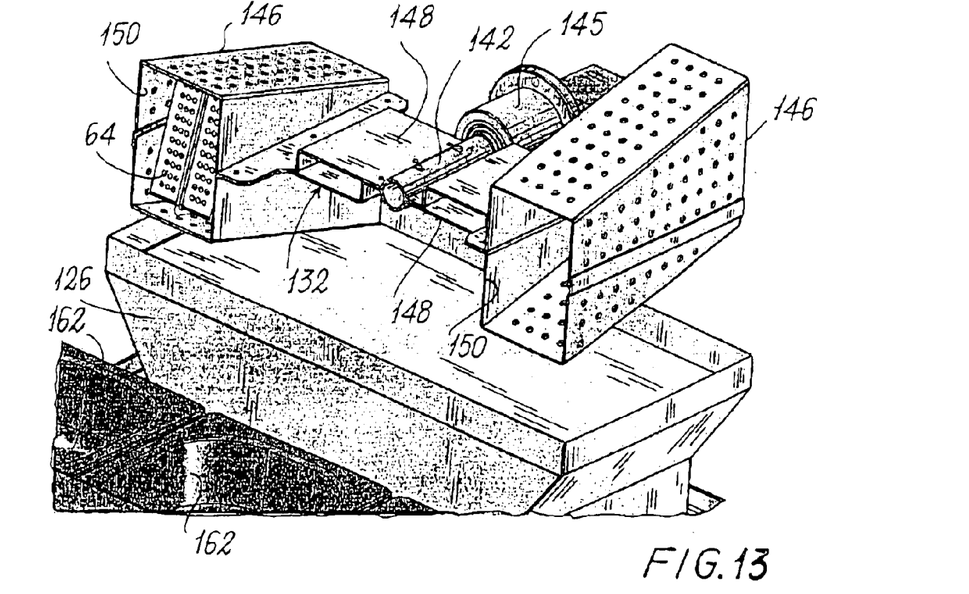
FIG. 13 is an enlarged perspective view of some particulars visible in FIGS. 11 and 12.

As can be seen in FIGS. 11–13, each seats 146 consists of a basket having a performed walls, the axis of each baskets not laying in the plane containing arms 148 and shaft 142, but in a plane parallel to the shaft 142 and perpendicular to the above mentioned plane, the basket axis forming an angle (preferably 10–30 degrees) with respect to the latter plane, so that the aperture 150 of a basket 146 is at a higher level than the opposite wall of this basket when the latter is at the feading station 152. The latter in the specific case consists of a funnel which facilitates the insertion of the container 64 in the relative basket 146.

When the aperture 150 of one basket 146 is at a station 152 in which pasta can be fed to the relative basket 146, the other basket 146 is at a station 156 in which the cooked pasta can be extracted authomatically from the relative basket 146 due to the inclination of the latter.

The machine 110 is designed to receive a container such as that disclosed above and indicated with 64. Due to the angle formed by the basket axis, the container (64) inserted in the basket 146 at the feeding station 152 cannot come out during the rotation of the rotatable element 132, when the basket 146 is immersed in water in the vessel 126, whereas the container 64 authomatically slides out from the basket 146 when it is at the station 156 which also consists of a funnel to facilitate the discharge of the container 64 containing the cooked food, the container resting onto the retainer 157.

The container 64 can then be taken and opened, so that the cooked pasta can be served.

Within the drawer 121 there are provided trays 62 containing sauces for flavouring the pasta or, more generally, the food (such as fryed or boiled potatoes).

As can be understood from the preceeding description of the machine 110, the latter is very simple and cheap.

Finally, it is to be noted that by using the machine 110, the rib 70 of the container 64 is not necessary.

What is claimed is:

1. An automatic machine for cooking food in a liquid, comprising a vessel for the cooking liquid, means for heating the cooking liquid, and means for maintaining the liquid level in the cooking vessel substantially constant, characterized by comprising a series of liquid-permeable seats, each arranged to receive food to be cooked or food whose cooking has to be completed, means for moving the seats along a predetermined cyclic path, during a part of which the food contained in the seats is immersed in the cooking liquid for a time sufficient to cook the food or to complete its cooking, a station in which the food to be cooked or the food for completion of cooking can be fed into each seat, and a station in which the cooked food can be extracted from the relative seat, wherein the predetermined cyclic path undergone by the seats is circular and lies in a vertical plane, and wherein the seats are provided in a wheel element rotatable about its horizontal axis, the seats opening at the periphery of the wheel element, this latter being contained in a perforated cylindrical element fixed to the machine structure, the cylindrical element externally closing the seats except in correspondence with the loading station.

2. An automatic machine for cooking food in a liquid, comprising a vessel for the cooking liquid, means for heating the cooking liquid, and means for maintaining the liquid level in the cooking vessel substantially constant, characterized by comprising a series of liquid-permeable seats, each arranged to receive food to be cooked or food whose cooking has to be completed, means for moving the seats along a predetermined cyclic path, during a part of which the food contained in the seats is immersed in the cooking liquid for a time sufficient to cook the food or to complete its cooking, a station in which the food to be cooked or the food for completion of cooking can be fed into each seat, and a station in which the cooked food can be extracted from the relative seat,     wherein a semi-cylindrical element fixed to the structure of the machine is provided to close the bottom of the seats when these latter lie in the upper half of the wheel element.

3. The machine as claimed in claim 2, wherein the discharge station comprises an aperture provided in the top of the fixed semi-cylindrical element and communicating with an underlying discharge chute.

4. The machine as claimed in claim 3, wherein below the chute there is provided a tray for collecting the cooked food descending from the chute.

5. The machine as claimed in claim 1, wherein an electric motor is provided, the drive shaft of which is coaxial to the wheel element, on the free end of the drive shaft there being keyed a pinion which engages in a toothed bush rigid with the wheel element and coaxial to the latter.

6. An automatic machine for cooking food in a liquid, comprising a vessel for the cooking liquid, means for heating the cooking liquid, and means for maintaining the liquid level in the cooking vessel substantially constant, characterized by comprising a series of liquid-permeable seats, each arranged to receive food to be cooked or food whose cooking has to be completed, means for moving the seats along a predetermined cyclic path, during a part of which the food contained in the seats is immersed in the cooking liquid for a time sufficient to cook the food or to complete its cooking, a station in which the food to be cooked or the food for completion of cooking can be fed into each seat, and a station in which the cooked food can be extracted from the relative seat,     wherein the means for maintaining the liquid level in the cooking vessel substantially unchanged comprise a bottle element which when filled with the liquid is disposed inverted above the cooking vessel so that its mouth is immersed in the liquid of the vessel.

7. The machine as claimed in claim 1, wherein the wheel element is rotatably supported by idle rollers radially equidistant from the axis of rotation of the wheel element and projecting outwards from a relative side of the wheel element, the rollers of each side being able to slide along a relative vertical circular guide fixed to the structure of the machine.

8. The machine as claimed in claim 7, wherein the rollers present a raised outer edge which cooperates with the outer side of the relative circular guide to maintain the wheel element in position.

9. An automatic machine for cooking food in a liquid, comprising a vessel for the cooking liquid, means for heating the cooking liquid, and means for maintaining the liquid level in the cooking vessel substantially constant, characterized by comprising a series of liquid-permeable seats, each arranged to receive food to be cooked or food whose cooking has to be completed, means for moving the seats along a predetermined cyclic path, during a part of which the food contained in the seats is immersed in the cooking liquid for a time sufficient to cook the food or to complete its cooking, a station in which the food to be cooked or the food for completion of cooking can be fed into each seat, and a station in which the cooked food can be extracted from the relative seat, wherein some trays for sauces are provided.

10. The machine as claimed in claim 9, wherein the trays are positioned adjacent to the vessel so that the sauces are maintained warm.

11. The machine as claimed in claim 9, wherein the trays are heated by independent heating means.

12. An automatic machine for cooking food in a liquid, comprising a vessel for the cooking liquid, means for heating the cooking liquid, and means for maintaining the liquid level in the cooking vessel substantially constant, characterized by comprising a series of liquid-permeable seats, each arranged to receive food to be cooked or food whose cooking has to be completed, means for moving the seats along a predetermined cyclic path, during a part of which the food contained in the seats is immersed in the cooking liquid for a time sufficient to cook the food or to complete its cooking, a station in which the food to be cooked or the food for completion of cooking can be fed into each seat, and a station in which the cooked food can be extracted from the relative seat,     wherein the predetermined cyclic path undergone by the seats is circular and lies in a vertical plane, and     wherein the seats are provided in a rotatable element having one or more arms, the seats being at the outer end of relative arms radially extending from a shaft and equally spaced apart, the seats being opened towards the front side of the machine.

13. The machine as claimed in claim 12, wherein there are provided two seats.

14. The machine as claimed in claim 12, wherein the seats are baskets having perforated walls, the axis of each basket lying in a plane parallel to the shaft and perpendicular to the plane containing the relevant arm and the shaft, the basket axis forming an angle with respect to the latter plane, so that the aperture of a basket has a higher level than the opposite wall of the basket when the latter is at the feeding station.

15. The machine as claimed in claim 14, wherein the angle formed by the basket axis with respect to the plane containing the relevant arm and shaft is 10–30 degrees.

16. The machine as claimed in claim 12, wherein a drawer is provided at the lower front part of the machine; the drawer containing trays for sauces.

17. An automatic machine for cooking food in a liquid, comprising a vessel for the cooking liquid, means for heating the cooking liquid, and means for maintaining the liquid level in the cooking vessel substantially constant, characterized by comprising a series of liquid-permeable seats, each arranged to receive food to be cooked or food whose cooking has to be completed, means for moving the seats along a predetermined cyclic path, during a part of which the food contained in the seats is immersed in the cooking liquid for a time sufficient to cook the food or to complete its cooking, a station in which the food to be cooked or the food for completion of cooking can be fed into each seat, and a station in which the cooked food can be extracted from the relative seat,     wherein the seats are able to receive a container, permeable to the liquid, in which the food to be cooked or for completion of cooking is previously placed, the container being openable and being formed of a material suitable for contact with food but which does not deform when immersed in the cooking liquid.

18. The machine as claimed in claim 17, wherein means are provided in each seat to enable the relevant container to be positioned in a predetermined position therein.

19. The machine as claimed in claim 18, wherein, the closed container being of the type having a peripherical flat rib, the positioning means comprise a pair of opposing radial grooves provided in the lateral walls of each seat, opposing parts of the rib being insertable into the radial grooves.

20. Container able to receive a predetermined quantity of raw or partially cooked food, usable with the machine according to claim 17, the container being permeable to the liquid, openable and formed of a material suitable for contact with food.

21. The container as claimed in claim 20, wherein the material thereof is substantially rigid.

22. The container as claimed in claim 21, wherein the container has a substantially parallelepiped shape.

23. The container as claimed in claim 20, wherein the container is a bag.

24. The container as claimed in claim 22, comprising two equal and specular hinged portions having a basin shape.

25. The container as claimed in claim 24, wherein each of the two portions having a basin shape is provided with a flat edge rib, the two adjacent ribs forming a middle, double rib in the closed container.

26. The container as claimed in claim 19, wherein the material forming the same is suitable to be also deep frozen.

27. The container as claimed in claim 26, wherein the material forming the same can withstand temperatures between −25° C. and 230° C.

* * * * *